US005534046A

United States Patent [19]
Kepplinger et al.

[11] Patent Number: 5,534,046
[45] Date of Patent: Jul. 9, 1996

[54] PROCESS FOR PRODUCING MOLTEN PIG IRON OR MOLTEN STEEL PRE-PRODUCTS

[75] Inventors: Werner Kepplinger, Leonding; Panajiotis Matzawrakos; Johannes Schenk, both of Linz; Dieter Siuka, Neuhofen; Christian Böhm, Wels, all of Austria

[73] Assignees: Voest-Alpine Industrieanlagenbau GmbH, Linz, Austria; Research Institute of Industrial Science & Technology, Incorporated Foundation, Pohang, Rep. of Korea

[21] Appl. No.: 461,710

[22] Filed: Jun. 5, 1995

Related U.S. Application Data

[62] Division of Ser. No. 139,528, Oct. 20, 1993.

[30] Foreign Application Priority Data

Oct. 22, 1992 [AT] Austria ................................ 2096/92

[51] Int. Cl.⁶ .................................................. C21B 13/14
[52] U.S. Cl. ................................................................ 75/446
[58] Field of Search ............................ 75/436, 443, 444, 75/445, 446, 453

[56] References Cited

U.S. PATENT DOCUMENTS 4,978,387  12/1990  Kepplinger .
5,082,251   1/1992  Whipp .

Primary Examiner—Melvyn Andrews

[57] ABSTRACT

A process for producing molten pig iron or molten steel pre-products from charging substances formed of iron ores and fluxes and at least partially comprising fines, wherein the charging substances are directly reduced to sponge iron in at least one reduction zone by the fluidized layer process, the sponge iron is melted in a melting-gasifying zone under supply of carbon carriers and oxygen-containing gas, and a CO and $H_2$-containing reducing gas is produced, which is injected into the reduction zone, is reacted there, is withdrawn as an export gas and is supplied to a consumer, is to be improved with a view to rendering feasible the use of fine ore in an economic manner. This is effected in that primarily hematite and/or magnetite fine ores and/or ore dusts are subjected to preheating by the fluidized layer process in a preheating zone, the thus preheated charging substances are completely reduced to a major extent in at least one consecutively arranged reduction zone, whereupon at least the more finely particulate charging substances are charged into the fluidized bed and/or, if desired, also into the fixed bed, of the melting-gasifying zone by forced conveyance, preferably by pneumatic conveyance, and are melted there.

9 Claims, 3 Drawing Sheets

5,534,046

PROCESS FOR PRODUCING MOLTEN PIG IRON OR MOLTEN STEEL PRE-PRODUCTS

This is a division of application Ser. No. 08/139,528, filed Oct. 20, 1993.

BACKGROUND OF THE INVENTION

1. Field of the Invention

The invention relates to a process for producing molten pig iron or molten steel pre-products from charging substances formed of iron ores and fluxes and at least partially comprising fines, wherein the charging substances are directly reduced to sponge iron in at least one reduction zone by the fluidized layer method, the sponge iron is melted in a melting-gasifying zone under supply of carbon carriers and oxygen-containing gas, and a CO and $H_2$-containing reducing gas is produced, which is injected into the reduction zone, is reacted there, is withdrawn as an export gas and is supplied to a consumer, as well as a plant for carrying out the process.

2. Description of the Related Prior Art

A process of this kind is known, for instance, from Austria Patent AT-B 390 622. According to AT-B 390 622, charging substances having largely varying grain sizes are processed, the charging substances being pre-reduced and separated by wind screening into fractions of different grain sizes, which are then completely reduced separately. However, this known one-step process only offers a low thermal utilization of the reducing gas and consequently involves an elevated consumption of reducing gas. Nor is the optimum utilization of the energy chemically bound in the reducing gas feasible.

According to Austrian Patent AT-B 387 403, siderite-containing and/or hydrated charging substances are calcined in a fixed-bed heating zone preceding the fixed-bed direct reduction zone, wherein, however, only coarse lumps of iron-ore-containing charging substances capable of being processed merely in the fixed bed are used for charging.

From U.S. Pat. No. 5,082,251, a direct reduction process is known, according to which fine ores rich in iron are reduced after complex ore preparation, such as drying, screening and arrangements by aid of reformed natural gas or oil so as to obtain a very narrow grain size distribution. Subsequently, the iron powder is hot- or cold-briquetted. Smoke gas is used as the fluidizing gas in the preheating stage, which is produced by burning air and natural gas; thus, external energy must be introduced, only the sensible heat of the whirling gases being utilizable. In contrast, reduction according to the process of the present invention is effected by means of solid carbon carriers, such as coal, and hence, according to the invention, CO reduction is preponderant, whereas, according to U.S. Pat. No. 5,082,251, the direct reduction of ore primarily is effected by $H_2$.

The invention has as its object to provide a process of the initially defined kind as well as a plant for carrying out the process, which enable the use of iron ores and fluxes comprising at least a share of frees, in an economic manner by using untreated coal as a carbon carrier, wherein the chemically bound energy (CO, $H_2$-content) still contained in the reducing gas used can be utilized.

In accordance with the invention, this object is achieved with a process of the initially defined kind in that primarily hematite and/or magnetite fine ores and/or ore dusts are subjected to preheating by the fluidized layer method in a preheating zone, the thus preheated charging substances are completely reduced to a major extent in at least one consecutively arranged reduction zone, whereupon at least the more finely particulate charging substances are charged into the fluidized bed and/or, if desired, also into the fixed bed, of the melting-gasifying zone by forced conveyance, preferably by pneumatic conveyance, and are melted there.

It is essential to the present invention that the charging substances are processed not in the material counterflow as is the case with the known fixed-bed methods (AT-B 387 403), but in stable or circulating fluidized layers, i.e., for instance, in diagonal flow, thus enabling the economic processing of fine ores and ore dusts on account of the improved energetic gas utilization. This is of importance, because, at present, about 75% of the world's ores occurs as fine ore, which is cheaper than lumpy ore or agglomerates. According to the invention, not only reduction is effected by the fluidized layer method, but also preheating. By the multi-step fluidized layer method according to the invention it has become possible to use the reducing gas in an optimum manner without having to feed additional energy.

A substantial advantage of the process according to the present invention is to be seen in that ore preheating is effected by means of process reducing gas from the final reduction stage and not by external gas supply as according to U.S. Pat. No. 5,082,251, which, of course, involves accordingly high costs. Another advantage of the gas control implied by the present invention resides in that pre-reduction can be achieved by the reducing atmosphere in addition to preheating, a particularly efficient utilization of the reducing gases, thus, being ensured.

To cool the reducing gas formed in the melting-gasifying zone, the reducing gas, according to the present invention, partially is fed directly to the reduction zone for forming a fluidized layer and partially, after purification in a hot cyclone and in a scrubber, is admixed as a cooling gas to the first portion of the reducing gas fed to the reduction zone.

To control the state of fluidization of the charging substances in the reducing zone, a portion of the reducing gas advantageously is fed to the reduction zone in the region of the fluidized layer and part of the portion of the reducing gas supplied to the hot cyclone is fed to the reduction zone into a fluidized bed formed in the lower part thereof.

To efficiently preheat the charging substances, the reducing gas leaving the reduction zone advantageously is fed to the preheating zone, a temperature increase being effected by the partial combustion of the reducing gas.

To efficiently use the dust and fines incurring in reduction, the reducing gas withdrawn from the reduction zone advantageously is freed from fines in a reduction cyclone and the fines separated in the reduction cyclone are completely reduced to a major extent during separation and are supplied by means of an injector to the melting-gasifying zone in the region of feeding of oxygen-containing gas.

Fines that have been completely reduced in the reduction zone already prematurely, suitably are partially discharged from the fluidized layer of the reduction zone and are supplied by means of an injector to the melting-gasifying zone in the region of feeding of oxygen-containing gas via a sleuce system, the portion of charging substances discharged from the fluidized layer of the reduction zone suitably being supplied to the melting-gasifying zone together with the material separated in the reduction cyclone.

In doing so, the dust separated in the hot cyclone advantageously is supplied to the melting-gasifying zone in the region between a fine-coke fluidized bed forming there and a coarse-coke fluidized bed, via a sleuce system by aid of an injector and by means of an oxygen dust burner.

Suitably, the addition of fluxes is effected by charging a portion of the fluxes required for the melting process, together with the coal, directly into the melting-gasifying zone and a portion of the fluxes, together with the free ore, into the preheating zone, wherein, advantageously, the fluxes charged together with the coal are introduced as coarse grains, preferably ranging between 4 mm and 12.7 mm, and the fluxes charged together with the fine ore are introduced in a fine-grain form, preferably ranging between 2 mm and 6.3 mm.

Particularly efficient reduction may be obtained by providing two locally separated consecutively arranged reduction zones, the reducing gas leaving the first reduction zone being conducted to the second reduction zone preceding the first reduction zone in the sense of the fine ore flow and from there being fed to the preheating zone under compression.

To utilize the excess gas incurring from the process, the export gas leaving the preheating zone, according to a preferred embodiment, if desired, upon admixture of a portion of the reducing gas leaving the reduction zone, after $CO_2$ purification, is used for producing hot-briquetted iron, wherein fine ore is subjected to preheating in a preheating zone, subsequently is subjected to a largely complete reduction in at least one reduction zone and, furthermore, is supplied to a compressing and briquetting means, and the export gas, upon heating, is conducted into the at least one reduction zone under formation of a fluidized bed, and, after having flown therethrough, is withdrawn from the same and is fed to the preheating zone under partial combustion with a view to temperature elevation for the purpose of forming a fluidized bed.

An arrangement for carrying out the process according to the invention, comprising at least one reduction reactor, into which a conveying duct for charging substances containing iron ore and fluxes, a gas duct for a reducing gas as well as a conveying duct for the reduction product formed therein and a gas duct for the export gas enter, and comprising a melter gasifier, into which the conveying duct conducting the reduction product from the reduction reactor enters and which comprises feed ducts for oxygen-containing gases and carbon carriers as well as taps for pig iron or steel premateriai and slag, wherein the gas duct for reducing gas formed in the melter gasifier entering the reduction reactor departs from the melter gasifier, is characterized in that the reduction reactor is designed as a fluidized-layer reduction reactor and that, in the flow direction of the charging substances, a fluidized-layer preheating reactor precedes the fluidized-layer reduction reactor, the gas duct of the fluidized-layer reduction reactor entering into the fluidized-layer preheating reactor, and that a pneumatic conveying duct is provided for conveying the sponge iron formed in the fluidized-layer reduction reactor into the melter gasifier, the conveying duct entering the melter gasifier on the level of the fluidized bed and/or fixed bed.

The reduction process may be controlled via the degree of fluidization prevailing within the reduction reactor (and also within the preheating reactor) advantageously in that the fluidized-layer reduction reactor comprises a lower part having a smaller diameter and an upper part following upon the lower part and having a larger diameter, the transition from the lower part to the upper part being conically designed and the gas duct for the reducing gas entering the conical transition piece, wherein the fluidized-layer preheating reactor suitably has a conical lower end into which the gas duct for the reducing gas runs.

In order to be able to discharge completely reduced fines from the fluidized-layer reduction reactor, the fluidized-layer reduction reactor, on the level of the fluidized layer, is provided with a fines discharge means, from which a conveying means leads to a pneumatic conveying means entering into the melter gasifier on the level of the fixed bed or fluidized bed formed therein.

According to a preferred embodiment, two fluidized-layer reduction reactors are consecutively provided in the flow direction of the charging substances.

A particularly efficient utilization of the excess gases forming is provided if the gas duct for the export gas, after the intermediate arrangement of a $CO_2$ scrubber and a heating means, runs into at least one reduction reactor for producing hot-briquetted iron, from which reduction reactor a gas duct is conducted into a fluidized-layer preheating reactor, wherein a fine-ore charging duct enters into the fluidized-layer preheating reactor and a conveying duct departs from the fluidized-layer preheating reactor, conducting the preheated fine ore to the reduction reactor, and if a compressing and briquetting means is arranged to follow the reduction reactor in the direction of the fine-ore flow.

Other features and advantages of the present invention will become apparent from the following description of the invention which refers to the accompanying drawings.

DETAILED DESCRIPTION OF THE PREFERRED EMBODIMENTS

Figure 1:
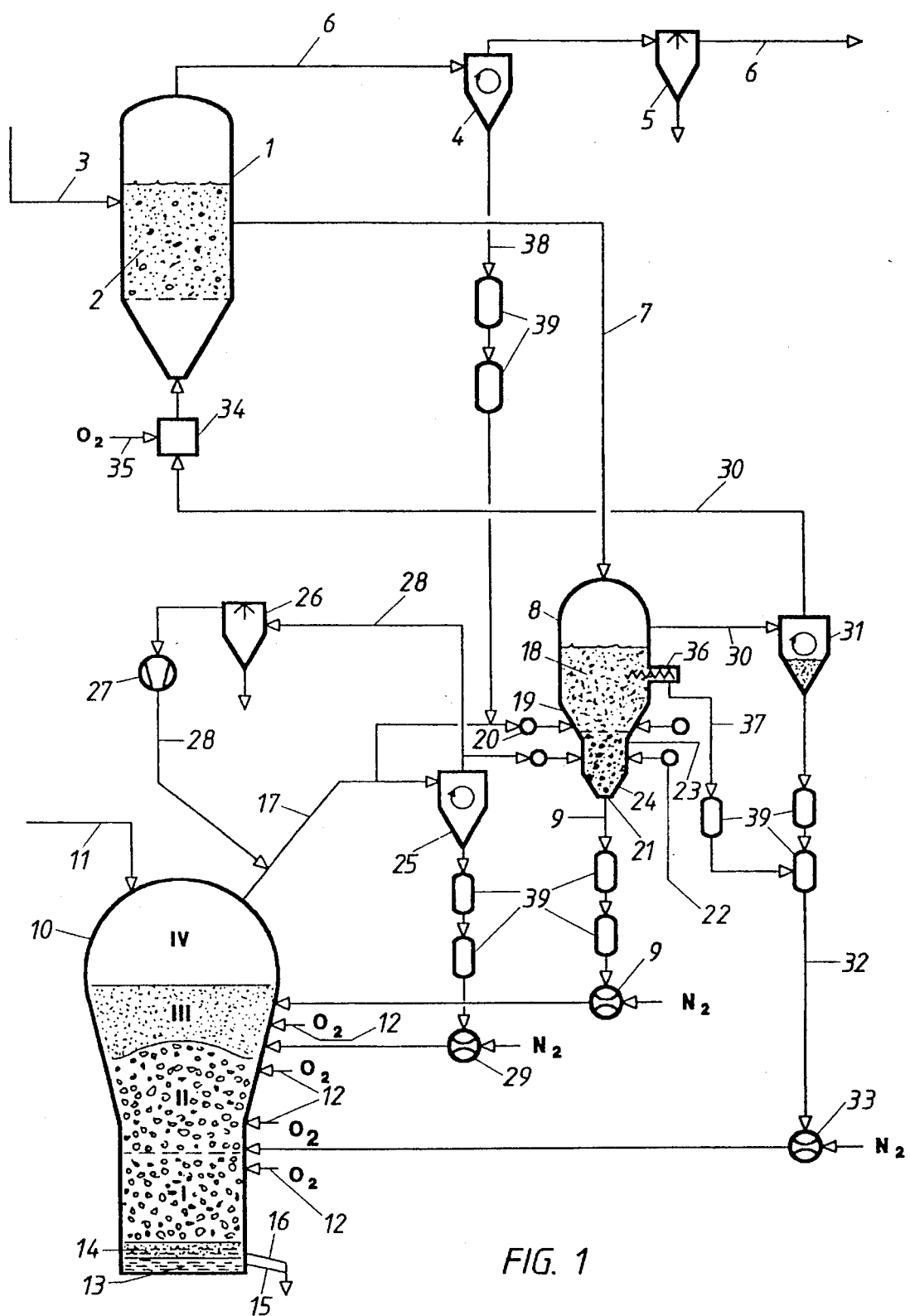
FIG. 1 or 3 each depict an advantageous embodiment of a plant according to the invention in schematic illustration.

Referring to FIG. 1, by 1 a preheating reactor is denoted, which is designed as a fluidized-layer preheating reactor and into which charging substances containing iron ore and fluxes are chargeable via a charging duct 3 entering laterally on the level of the fluidized-bed zone 2 (preheating zone ). On the upper end of the shaft-like designed fluidized-layer preheating reactor 1, the gases formed therein and flowing therethrough are withdrawn via a gas discharge duct 6 equipped with a gas purifying cyclone 4 and a gas scrubber 5, such as a Venturi scrubber. These gases are available as high-quality export gases having a caloric value of about 8000 kJ/Nm$^3$ for various purposes, e.g., for the production of current with or without oxygen.

All of the charging substances preheated in the fluidized-layer preheating reactor 1, via a conveying duct 7, reach a reduction reactor 8 also designed as a fluidized-layer reactor and are completely reduced to a major extent in the same.

Via a pneumatic sponge-iron conveying duct 9 (including an $N_2$ injector)—any other forced conveyance could be provided instead—the sponge iron formed in the fluidized-layer reduction reactor 8 gets into a melter gasifier 10 by being introduced into the same on the level of a fluidized bed 1II, 1I provided in the melter gasifier and/or on the level of a fixed bed I located therebelow. The melter gasifier comprises at least one supply duct 11 for coal and fluxes as well as tuyere feeds 12 for oxygen-containing gases arranged on several levels.

Molten pig iron 13 and liquid slag 14 collect in the melter gasifier 10 below the melting-gasifying zone formed by a fixed bed I, a coarse coke fluidized bed II located thereabove, a fine coke fluidized bed III located above the latter and a killing space IV located on top, the pig iron and the slag being tapped separately via a tapping means 15, 16 each. In the melter gasifier 10, a reducing gas is produced from the carbon carriers and from the oxygen-containing gas, which reducing gas collects in the killing space IV above the fluidized bed III and is fed to the fluidized-layer reduction reactor 8 through a gas duct 17, via a frustoconical constriction of the substantially shaft-shaped fluidized-layer reduction reactor 8, constituting a gas distributing bottom 9 and provided for the purpose of forming a fluidized layer 18 or a fluidized bed 18 (reduction zone), the reducing gas being supplied via the periphery of the constriction by means of an annular duct 20.

The large solids particles in reduction reactor 8, which cannot be kept floating in the fluidized layer 28, centrally descend due to the effect of gravity and are withdrawn through a central solids discharge 21. This central solids discharge 21 is configured such that, via a radial gas feed means 22, a fixed-bed flow is formed into the cylindrical vessel part 23 having a conical bottom 24 and arranged below the frustoconical gas distributing bottom 19 such that the reduction even of large particles can be achieved to a satisfactory extent.

Due to the frustoconical shape of the gas distributing bottom 19, the clear tube velocity changes with the height. As a restfit, a special grain size distribution adjusts over the height of the gas distributing bottom 19. By appropriately arranging the tuyeres in the gas distributing bottom 19, an internally circulating fluidized layer can, thus, be formed, where the gas velocity is higher in the center than on the periphery. The formation of a fluidized layer of this type may be used both for the reduction reactor 8 and for the preheating reactor 1.

A portion of the reducing gas leaving the melter gasifier 10 is subjected to purification in a hot cyclone 25 and, via a gas duct 28, to cooling in a consecutively arranged scrubber 26, and, via a compressor 27, is again admixed to the reducing gas leaving the melter gasifier 10. The dust separated in the hot cyclone 25 is returned into the melter gasifier 10 via an $N_2$ injector 29. A portion of the still uncooled reducing gas leaving the hot cyclone 25 reaches the fluidized-layer reduction reactor 8 through its cylindrical vessel part 23 via the gas feed means 22 formed by an annular duct.

The gas withdrawn from the fluidized-layer reduction reactor 8, via a gas duct 30, is fed to a reduction cyclone 31, in which fines still contained in the reactor reducing gas are separated and reduced completely. These fines are introduced into the melter gasifier 10 approximately on the level of the upper end of the fixed bed I via a conveying duct 32 and an $N_2$ injector 33.

The partially oxidized reducing gas emerging from the reduction cyclone 8, via the gas duct 30, gets into the fluidized-layer preheating reactor 1, wherein, however, part of the same is burned for heating the reducing gas in a combustion chamber 34, into which a duct 35 feeding an oxygen-containing gas enters.

From the fluidized-layer reduction reactor 8, a portion of the completely reduced charging substances is withdrawn on the level of the fluidized bed 18 by means of a worm conveyor 36 and, preferably together with the fines coming from the reduction cyclone 31, is introduced into the melter gasifier 10 approximately on the level of the upper end of the fixed bed I by means of a conveying duct 37 via an $N_2$ injector 33.

The finely particulate material separated in the cyclone 4 of the export gas discharge duct 6 is charged via a conveying duct 38 including sleuces 39—which are also provided in the other conveying ducts 32, 37 for the partially or completely reduced material—through the annular duct 20 feeding the reducing gas into the fluidized-layer reduction reactor 8.

The plant according to FIG. 1, in detail, functions as follows:

The fine ore treated—sieved and dried—and having a grain size distribution of, for instance, –0.044 mm=approx. 20%

0.044–6.3 mm=approx. 70%

6.3–12.7 mm=approx. 10% and a moisture content of approximately 2% is charged into the preheating reactor 1 pneumatically or by aid of a steep belt or vertical conveyor. There, it is preheated to a temperature of about 850° C. in the fluidized-bed zone 2 and optionally is pre-reduced on account of the reducing atmosphere to about the wuestite stage.

For this pre-reduction procedure, the reducing gas is to contain at least 25% $CO+H_2$ in order to have sufficient reducing power.

Subsequently, the preheated and optionally pre-reduced fine ore flows into the reduction reactor 8—preferably due to gravity—, in the fluidized layer or fluidized bed 18 of which the fine ore is largely reduced to the Fe stage at a temperature of about 850° C.

For this reduction procedure, the gas is to have a content of $CO+H_2$ of at least 68%. In the reduction reactor 8, screening of the fine ore takes place, the portion of below 0.2 mm being entrained by the reducing gas into the reduction cyclone 31. There, the complete reduction of the fine ore of below 0.2 mm occurs during the separation of the solids by the cyclone effect.

The finer solids portion discharged from the fluidized layer 18 of the reduction reactor 8 by aid of the discharge worm 36 is supplied to the melter gasifier 10 in the region of the blow-in planes of the oxygen-containing gases via sleuces 39, together with the fine ore separated in the reduction cyclone 31, by aid of the $N_2$ injector 33.

The coarser solids portion from the lower region of the reduction reactor 8 is blown or charged into the melter gasifier 10 in the region of the fine-coke fluidized bed III via sleuces 39 and by aid of the $N_2$ injector 9 or by means of gravity discharge.

The dust separated in the hot cyclone 25 (primarily containing Fe and C) is fed to the melter gasifier 10 in the region between the fine-coke fluidized bed III and the coarse-coke fluidized bed H via sleuces 39 by aid of the $N_2$ injector 29 and by means of an oxygen dust burner.

For the purpose of preheating and calcining, the fluxes required for the process are charged as coarse grains, preferably having grain sizes ranging between 4 and 12.7 mm, via the coal path (11) and as fine grains, preferably having grain sizes ranging between 2 and 6.3 mm, via the fine-ore path (3).

Figure 2:
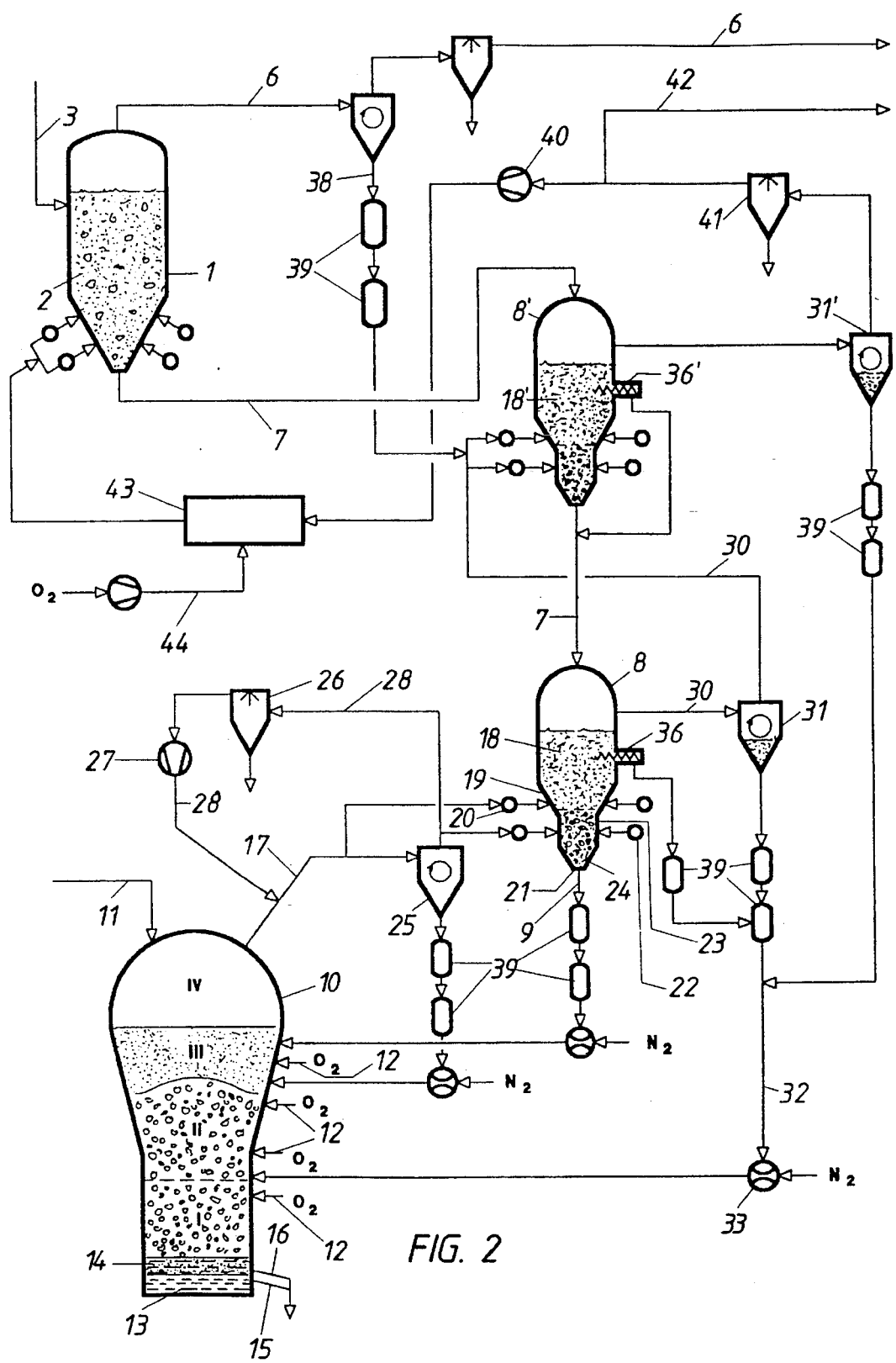

For fine ores requiring longer reduction times, a second (as well as, if required, a third) fluidized-layer reduction reactor 8' including an additional reduction cyclone 31' is provided in series or in succession to the first reduction reactor 8, as is illustrated in FIG. 2. The fine ore is reduced to the wuestite stage in the second reduction reactor 8' and to the Fe stage in the first reduction reactor 8.

In this case, the solids portion discharged from the fluidized layer 18' of the second reduction reactor by aid of the discharge worm 36' is charged into the first reduction reactor 8 by gravity, together with the coarser solids portion from the lower region of the second reduction reactor 8'. The fine ore separated in the second reduction cyclone 31' is supplied to the melter gasifier 10 in the region of the blow-in planes of the oxygen-containing gases by aid of the $N_2$ injector 33, together with the free ore separated in the first reduction cyclone 31.

If, when using two fluidized-layer reduction reactors 8, 8' and two reduction cyclones 31, 31', the operational pressure does not suffice to balance out pressure losses in the system, the gas mixture required for the preheating reactor 1, according to the invention, is brought to the necessary pressure by aid of a compressor 40. In this case, the gas from the second reduction cyclone 31' is cleaned in a scrubber 41. However, in the following, only a partial stream of the gas is compressed—a portion being withdrawn through duct 42 as export gas—and is appropriately mixed with an oxygen-containing gas fed through duct 44 in a mixing chamber 43 such that a partial combustion of the reducing gas subsequently can occur in the preheating reactor 1 for the purpose of attaining the fine-ore preheating temperature required.

The high-quality export gas from the pig iron production may be used for the production of current with or without oxygen, as indicated above. According to a preferred embodiment of the invention, which is represented in FIG. 3, the export gas, after $CO_2$ scrubbing 45 and preheating 46 to about 850° C., is re-used as a reducing gas, in the following manner:

To produce hot-briquetted iron, fine ore of the same specification as used for the production of pig iron is preheated and reduced by the reducing gas in the same aggregates as used in pig iron production. The completely reduced grain fractions from the at least one reduction reactor 8 and from the reduction cyclone 31 are blown into a charging bunker 47 by aid of $N_2$ injectors 33. Alternatively, the coarser grain fraction can be charged from the lower region of the reduction reactor 8 into the charging bunker 47 by a gravity discharge.

After this, the completely reduced free ore having a degree of metallization of about 92% and a temperature of at least 750° C. reaches a roll briquetting press 49 due to gravity via a pre-compressing worm 48 including a controllable motor.

Figure 3:
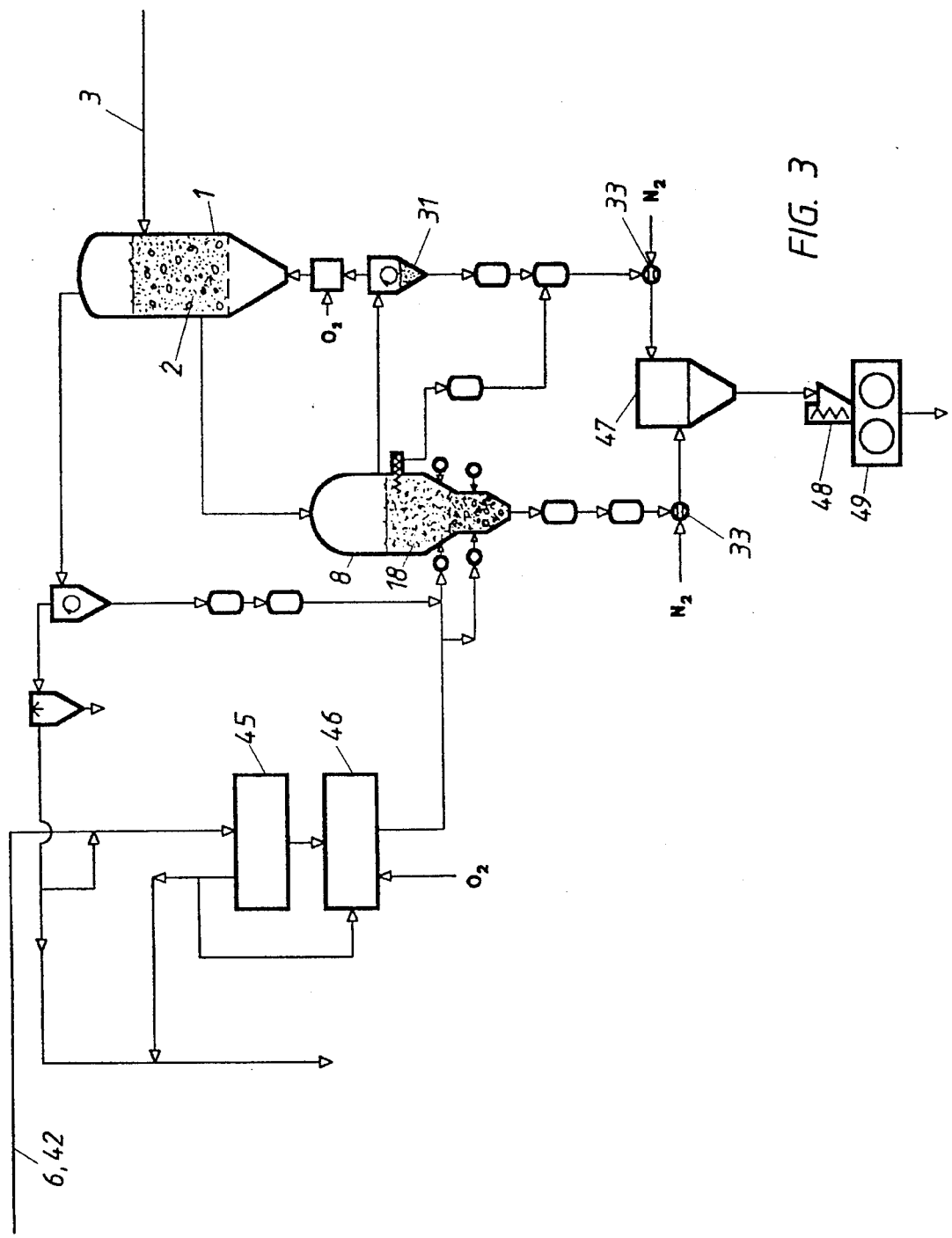

In the following examples, typical characteristic data of the process according to the invention obtained in operating the plants according to the embodiments represented in FIGS. 1 to 3 are summarized.

EXAMPLE

| Coal analysis (dry analysis values) | |
|---|---|
| C | 77% |
| H | 4.5% |
| N | 1.8% |
| O | 7.6% |
| S | 0.5% |
| ashes | 9.1% |
| $C_{fix}$ | 61.5% |
| Ore analysis (moist analysis values) | |
| Fe | 62.84% |
| $Fe_2O_3$ | 87.7% |
| CaO | 0.73% |
| MgO | 0.44% |
| $SiO_2$ | 6.53% |
| $Al_2O_3$ | 0.49% |
| MnO | 0.15% |
| losses on ignition | 0.08% |
| moisture | 2% |

| Grain size distribution of fine ore | |
|---|---|
| +10 mm | 0% |
| 10–6 mm | 5.8% |
| 6–2 mm | 44.0% |
| 2–0.63 mm | 29.6% |
| 0.63–0.125 mm | 13.0% |
| –0.125 mm | 7.6% |
| Fluxes (dry analysis values) | |
| CaO | 45.2% |
| MgO | 9.3% |
| $SiO_2$ | 1.2% |
| $Al_2O_3$ | 0.7% |
| MnO | 0.6% |
| $Fe_2O_3$ | 2.3% |
| losses on ignition | 39.1% |

For the production of 42 tons of pig iron/hour in the plant according to FIG. 1, 42 tons of coal/hour are gassed with 29,000 $Nm^3$ $O_2$/hour. The ore consumption therefor amounts to 64 tons/hour and the consumption of fluxes is 14 tons/hour.

In addition to iron, the pig iron produced has the following composition:

| C | 4.2% |
|---|---|
| Si | 0.4% |
| P | 0.07% |
| Mn | 0.22% |
| S | 0.04% |

The export gas from the pig iron plant incurs at 87,000 $Nm^3$/hour, having the following analysis:

| CO | 36.1% |
|---|---|
| $CO_2$ | 26.9% |
| $H_2$ | 16.4% |
| $H_2O$ | 1.5% |
| $N_2$ + Ar | 18.1% |
| $CH_4$ | 1% |
| $H_2S$ | 0.02% |
| Calorific value | 6780 kJ/$Nm^3$ |

When further utilizing the export gas from the pig iron plant for the production of hot-briquetted iron according to FIG. 3, 29 tons of hot-briquetted iron/hour can be produced. The amount of recycled gas required therefor is 36,000 $Nm^3$/hour. The hot-briquetted sponge iron has the following analysis values:

| Metallization | 92% |
|---|---|
| C | 1% |
| S | 0.01% |
| P | 0.03% |

The amount of export gas from the plant for the production of hot-briquetted iron is 79,000 $Nm^3$/hour, the gas having the following composition:

| CO | 21.6% |
|---|---|
| $CO_2$ | 44.1% |
| $H_2$ | 10.6% |
| $H_2O$ | 2.8% |
| $N_2$ + Ar | 19.9% |
| $CH_4$ | 1% |
| Calorific value | 4200 kJ/$Nm^3$ |

The necessary electric input of the pig iron plant and of the plant for the production of hot-briquetted iron is 23 MW.

The export gas after the plant for the production of hot-briquetted iron corresponds to a thermal output of 145 MW.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What we claim is:

1. In a process for producing molten pig iron or liquid steel pre-products from charging substances formed of iron ores and fluxes and at least partially including fines, by providing at least one reduction zone, directly reducing said charging substances to sponge iron in said at least one reduction zone by the fluidized layer method, providing a melting-gasifying zone containing a fluidized bed and a fixed bed, melting said sponge iron in said melting-gasifying zone under supply of carbon carriers and oxygen-containing gas to produce a reducing gas, introducing said reducing gas into said at least one reduction zone and reacting said reducing gas in said at least one reduction zone to obtain export gas, withdrawing said export gas and supplying said export gas to a consumer, the improvement comprising the steps of:

providing a preheating zone;

preheating at least one of fine ores and ore dusts in said preheating zone by the fluidized layer method so as to obtain preheated charging substances;

completely reducing said preheated charging substances to a major extent in said at least one reduction zone arranged to follow said preheating zone; and charging at least a more finely particulate fraction of said charging substances by forced conveyance into at least one of said fluidized bed and said fixed bed of said melting-gasifying zone.

2. A process as set forth in claim 1, wherein two locally separated consecutively arranged reduction zones are provided, said two reduction zones comprising a first reduction zone and a second reduction zone, said second reduction zone being upstream of said first reduction zone with respect to a direction of flow of said fine ore, the improvement further comprising the steps of:

feeding said reducing gas leaving said first reduction zone to said second reduction zone; and feeding said reducing gas from said second reduction zone to said preheating zone.

3. A process as set forth in claim 1, wherein export gas emerges from said preheating zone and upon $CO_2$ removal from said export gas, is used for producing hot-briquetted iron, the improvement further comprising the steps of:

subjecting fine ore to preheating in said preheating zone;

subjecting said fine ore to a substantially complete reduction in said at least one reduction zone to produce reduced fine ore; and supplying said reduced fine ore to a compressing and briquetting means.

4. A process as set forth in claim 3, further comprising admixing part of said reducing gas leaving said reduction zone to said export gas leaving said preheating zone.

5. The method of claim 3, further comprising the steps of:

introducing said export gas, upon heating, into said at least one reduction zone under formation of a fluidized bed;

feeding said heated export gas to said preheating zone for forming a fluidized bed; and at least partially combusting said heated export gas for temperature elevation of said fluidized bed.

6. A process according to claim 3, further comprising the step of mixing a portion of said reduction gas with said export gas.

7. A process for producing molten pig iron or liquid steel pre-products from a charging substance formed of iron ores and fluxes and at least partially including fines, the process comprising the steps of:

(a) preheating said charging substance so as to obtain a preheated charging substance;

(b) reducing said preheated charging substance in a first reduction zone to obtain sponge iron;

(c) melting said sponge iron in the presence of carbon carriers and oxygen-containing gas in a melting-gasifying zone to produce a reducing gas leaving said melting-gasifying zone and containing CO and H;

(d) reacting said reducing gas with said preheated charging substance in step (b) to obtain a reducing gas leaving said first reduction zone;

(e) dividing said reducing gas leaving said melting-gasifying zone into a first portion and a second portion, said second portion including entrained particles;

(f) passing said first portion of said reducing gas leaving said melting-gasifying zone into said first reduction zone;

(g) forming a fluidized layer with said first portion of said reducing gas leaving said melting-gasifying zone in said first reduction zone;

(h) purifying said second portion from step (f) of said reducing gas leaving said melting-gasifying zone by removing said entrained particles therefrom to form a purified second portion;

(i) splitting said purified second portion into a first part and a second part to obtain a first part and a second part of said purified second portion, respectively; and (j) passing said first part of said purified second portion into said first reduction zone in a fluidized bed area in a lower part of said first reduction zone.

8. A process as set forth in claim 7, further comprising the steps of:

feeding said reducing gas leaving said first reduction zone to a second reduction zone;

recovering a reducing gas from said second reduction zone; and feeding said reducing gas from said second reduction zone to step (a).

9. A process as set forth in claim 7, further comprising feeding said reducing gas leaving said first reduction zone to said preheating step (a), recovering an export gas from said preheating step (a) and, upon $CO_2$ removal from said export gas, using said export gas for producing hot-briquetted iron by the steps of:

(i) preheating fine ore to produce preheated fine ore;

(ii) substantially reducing said preheated fine ore to produce reduced fine ore;

(iii) supplying said reduced fine ore to a compressing and briquetting means; and (iv) introducing said export gas, upon heating, to step (ii) to produce heated export gas, recovering said heated export gas, and feeding said heated export gas to step (A) under partial combustion for temperature elevation.

* * * * *